US011735983B2

(12) United States Patent
Yu et al.

(10) Patent No.: US 11,735,983 B2
(45) Date of Patent: Aug. 22, 2023

(54) WIDENING APPARATUS FOR HAIRPIN-TYPE STATOR COIL

(71) Applicants: HYUNDAI MOTOR COMPANY, Seoul (KR); KIA CORPORATION, Seoul (KR)

(72) Inventors: Yeongsu Yu, Busan (KR); Myoung Gil Han, Ulsan (KR); Jiwon Yu, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/544,344

(22) Filed: Dec. 7, 2021

(65) Prior Publication Data

US 2022/0385151 A1    Dec. 1, 2022

(30) Foreign Application Priority Data

Jun. 1, 2021  (KR) .................. 10-2021-0070583

(51) Int. Cl.
*H02K 3/12*       (2006.01)
*H02K 15/06*      (2006.01)
*H02K 15/00*      (2006.01)

(52) U.S. Cl.
CPC .......... *H02K 15/0087* (2013.01); *H02K 3/12* (2013.01); *H02K 15/064* (2013.01)

(58) Field of Classification Search
CPC ..... H02K 3/12; H02K 15/0087; H02K 15/064
See application file for complete search history.

(56) References Cited

U.S. PATENT DOCUMENTS

| | | | |
|---|---|---|---|
| 2009/0178270 A1* | 7/2009 | Guercioni | H02K 15/0428 29/598 |
| 2009/0302705 A1* | 12/2009 | Guercioni | H02K 15/0428 310/216.069 |
| 2018/0212496 A1* | 7/2018 | Gohs | H02K 15/024 |
| 2020/0395825 A1* | 12/2020 | Binder | B21F 3/02 |
| 2022/0060091 A1* | 2/2022 | Ponzio | H02K 15/0081 |

FOREIGN PATENT DOCUMENTS

| | | | |
|---|---|---|---|
| JP | 2006-158044 A | * | 6/2006 |
| JP | 2015035922 | * | 2/2015 |
| JP | 2016187245 A | * | 10/2016 |
| WO | 2019161846 | * | 8/2019 |
| WO | 2020/127718 A1 | | 6/2020 |
| WO | 2020/127724 A1 | * | 6/2020 |

* cited by examiner

*Primary Examiner* — Peter Dungba Vo
*Assistant Examiner* — Jose K Abraham
(74) *Attorney, Agent, or Firm* — McDonnell Boehnen Hulbert & Berghoff LLP

(57) ABSTRACT

A widening apparatus for a hairpin-type stator coil is provided to extend a distance between welding portions of hairpin-type stator coils inserted into slots of a stator core, and the widening apparatus includes, a coil support unit installed on a base frame, a tool driving unit installed on the base frame to be vertically movable below the coil support unit, and including a first gear operation part and a second gear operation part, a plurality of lower widening tools operably connected to the first gear operation part, and reciprocally movable along a layer direction of the stator coils, and a plurality of upper widening tools operably connected to the second gear operation part, and configured to be reciprocally movable above the plurality of lower widening tools.

18 Claims, 24 Drawing Sheets

WIDENING APPARATUS FOR HAIRPIN-TYPE STATOR COIL

CROSS-REFERENCE TO RELATED APPLICATION

This application claims priority to and the benefit of Korean Patent Application No. 10-2021-0070583 filed in the Korean Intellectual Property Office on Jun. 1, 2021, the entire contents of which are incorporated herein by reference.

BACKGROUND

(A) Field

The disclosure relates to manufacturing of a drive motor. More particularly, the present disclosure relates to a widening apparatus for a hairpin-type stator coil applicable in manufacturing a stator of a hairpin winding type.

(B) Description of the Related Art

In general, hybrid vehicles or electric vehicles called environment-friendly vehicles employ a technology that generates driving torque by a drive motor.

As a part of reducing the weight and volume of vehicle and parts, automakers and environment-friendly part manufacturers are applying a drive motor with a stator wound with a hairpin type stator coil.

Such stators are manufactured through a process of inserting stator coils into slots of the stator core and a process of welding welds of the stator coils inserted into slots of the stator core.

On the other hand, before the welding process of the stator coils, a coil widening process of extending the distance between the welding portions by a widening tool is performed.

The coil widening process is necessary to secure the insulation distance of the welding portions and to improve the welding workability of the welding portions.

However, in such a coil widening process, when a specification of a stator is changed, a widening tool needs to be replaced, which may cause an increase in cycle time.

The above information disclosed in this Background section is only for enhancement of understanding of the background of the disclosure, and therefore it may contain information that does not form the prior art that is already known in this country to a person of ordinary skill in the art.

SUMMARY

An embodiments of the present disclosure provide a widening apparatus for a hairpin-type stator coil capable of extending the distance between welding portions of the stator coils without replacing a tool even if the specification of the stator is changed.

A widening apparatus for a hairpin-type stator coil according to an embodiment extends a distance between welding portions of hairpin-type stator coils inserted into slots of a stator core, and the widening apparatus includes, a coil support unit installed on a base frame, a tool driving unit installed on the base frame to be vertically movable below the coil support unit, and including a first gear operation part and a second gear operation part, a plurality of lower widening tools operably connected to the first gear operation part, and reciprocally movable along a layer direction of the stator coils, and a plurality of upper widening tools operably connected to the second gear operation part, and configured to be reciprocally movable above the plurality of lower widening tools.

The coil support unit may include, a support plate disposed on the base frame to be apart from an upper surface of the base frame, and a main support disk rotatably installed in an opening formed on the support plate and having a disk hole where the stator coils is positioned, where a plurality of coil support ribs are formed on an edge of the disk hole.

Each of the plurality of coil support ribs may extend radially inward from an edge of the disk hole, and configured to counteract a force received radially outward from the stator coils by the plurality of lower widening tools and the plurality of upper widening tools.

The main support disk may include a coil guide groove formed between the plurality of coil support ribs.

The coil support unit may further include, a rotation member having a ring shape rotatably coupled with a guide ring fixed to edge of the opening, and connected to the main support disk, and an actuator installed on the support plate and configured to rotate the main support disk by a preset angle bidirectionally through the rotation member.

The actuator may include an operation cylinder installed on the support plate, and operably connected to an extension portion extending radially outward from an edge of the rotation member.

The coil support unit may further include, a sub support disk fixed to the guide ring and configured to support an upper surface of the main support disk, and a stopper assembly installed on the sub support disk and configured to limit a rotation angle of the main support disk.

The stopper assembly may include, a cylinder body fixed to the sub support disk, a piston coupled to the cylinder body, and movable in a length direction of the cylinder body, and a stopper pin that is fixed to the main support disk, passes through a guide slot formed on the sub support disk, and rotatably coupled with the piston.

The tool driving unit may include, a lifting member connected to a first servo-motor installed on the base frame, and configured to be vertically liftable under the coil support unit, a gear mounting member fixedly mounted on the lifting member, and configured to mount the first gear operation part and the second gear operation part, a first movable rail disk operably connected to the first gear operation part, and forming a first cam follower rail on an upper surface of the first movable rail disk, and a second movable rail disk operably connected to the second gear operation part, and forming a second cam follower rail on an upper surface of second movable rail disk.

The lifting member may be fixed to a lower surface of the gear mounting member, installed on the base frame to be vertically movable by at least one guide rod, and screw-engaged with a ball screw coupled to the first servo-motor.

The first gear operation part may include, a second servo-motor installed on the gear mounting member, a first drive gear coupled to motor shaft of the second servo-motor, and a first driven gear rotatably mounted within an edge of the gear mounting member and engaged with the first drive gear.

The first movable rail disk may be coupled to the first driven gear through a first flange.

The first cam follower rail may be formed in a spiral shape.

The second gear operation part may include, a third servo-motor installed on the gear mounting member, a second drive gear coupled to motor shaft of the third servo-motor, and a second driven gear rotatably mounted on an edge side of the gear mounting member while interiorly disposing the first driven gear, and engaged with the second drive gear.

The second movable rail disk may be coupled to the second driven gear through a second flange.

The second cam follower rail may be formed in a spiral shape.

The tool driving unit may further include a fixed rail disk fixed to the gear mounting member disposing the first movable rail disk and the second movable rail disk below, where a plurality of guide rails radially are formed on an upper surface of fixed rail disk.

A rail groove radially extending from outer edge to inner edge of the fixed rail disk may be formed in each of the plurality of guide rails.

A rail hole may be formed between the plurality of guide rails to vertically penetrate the fixed rail disk.

Each of the plurality of lower widening tools may include, a first tool body coupled to the rail groove to be radially slidable, and disposed between and radially interior to the plurality of guide rails, a lower coil gripper coupled to the first tool body, and forming a first coil support hole that is vertically penetrated, and a first cam robe coupled to the first tool body, and configured to vertically pass through the rail hole to be inserted into the first cam follower rail.

The lower coil gripper may include a coil supporting portion vertically elongated at a radially interior end of the lower coil gripper.

A coil support groove connected to the first coil support hole may be formed in the coil supporting portion.

Each of the plurality of upper widening tools may include, a second tool body coupled to the rail groove to be radially slidable, and disposed between the plurality of guide rails and radially exterior to the first tool body, an upper coil gripper coupled to the second tool body above the lower coil gripper, and forming a second coil support hole connected to the first coil support hole, and a second cam robe coupled to the second tool body, and configured to vertically pass through the rail hole to be inserted into the second cam follower rail.

The upper coil gripper may include a coil pressing part formed at a radially interior end of the upper coil gripper and configured to pressurize the stator coils inserted into the first coil support hole.

According to an embodiment, replacement of tools is not required depending on the specifications of the stator, and it is possible to secure production flexibility for multi-type stators, shorten the process cycle time, and reduce equipment investment costs.

Other effects that may be obtained or are predicted by an exemplary embodiment will be explicitly or implicitly described in a detailed description of the present disclosure. That is, various effects that are predicted according to an exemplary embodiment will be described in the following detailed description.

BRIEF DESCRIPTION OF THE DRAWINGS

The embodiments herein may be better understood by referring to the following description in conjunction with the accompanying drawings in which like reference numerals indicate identically or functionally similar elements.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing specific examples only and is not intended to be limiting of the disclosure. As used herein, the singular forms are intended to include the plural forms as well, unless the context clearly indicates otherwise. As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. The term "coupled" denotes a physical relationship between two components in which components are directly connected to each other or indirectly through one or more intermediary components.

As used herein, the term "and/or" includes any one or all combinations of one or more related items. In addition, the term "operably connected" or the like means at least two members are directly or indirectly connected with each other. However, two members that are operably connected with each other do not always rotate with the same rotational speed and in the same rotation direction.

Hereinafter, an example of the present disclosure is described in detail with reference to the accompanying drawing.

Figure 1:
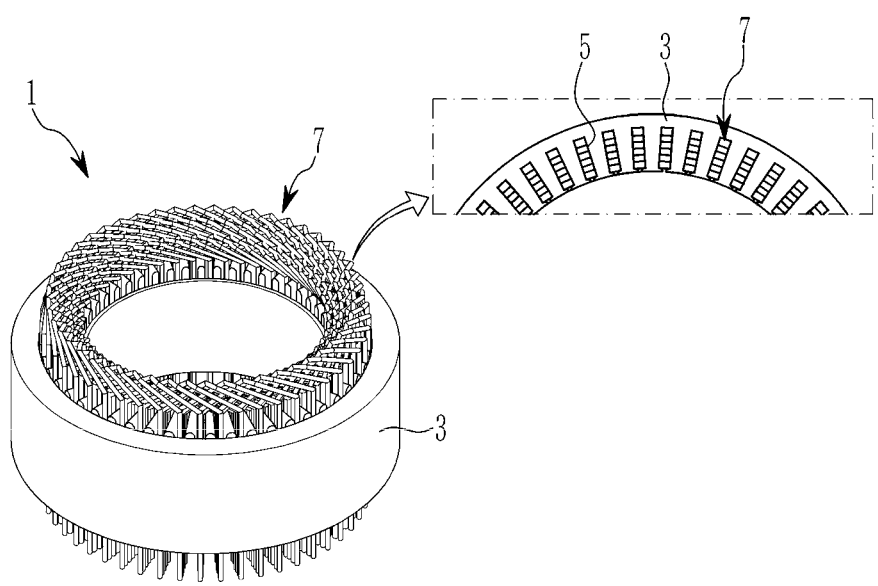
FIG. 1 illustrates an example of a hairpin winding type stator applied to an embodiment.

FIG. 1 illustrates an example of a hairpin winding type stator according to an embodiment.

Referring to FIG. 1, a stator 1 of the hairpin winding type according to an embodiment may be applied to a drive motor for a hybrid vehicle and/or an electric vehicle, which is an environment-friendly vehicle that obtains a driving torque by an electrical energy.

The drive motor includes the stator 1 according to an embodiment of the present disclosure, and a rotor (not shown) disposed with a preset air gap with the stator 1.

In an example, the drive motor may include a permanent magnet synchronous motor (PMSM).

Here, the stator 1 includes a stator core 3 formed by stacking multiple electrical steel sheets. The stator core 3 includes an outer circumferential surface and an inner circumferential surface, and a plurality of slots 5 (for example, 48 slots) are radially formed along the radial direction.

Stator coils 7 (also called "conductor", "segment coil", or "flat coil") of the hairpin type are wound in the slots 5.

In an example, the stator coils 7 may be provided in the form of a V-shaped hairpin type with a pair of legs. In another example, the stator coils 7 may be provided in the form of U-shaped or I-shaped hairpin types. Furthermore, the stator coils 7 may be provided as flat coils with a rectangular cross-section.

The stator coils 7 of the hairpin type are inserted into the slots 5 of the stator core 3. Legs of the stator coils 7 protrude outward through lower ends of the slots 5. The legs protruded through the lower ends of the slots 5 may be conjoined by welding to form an electrical circuit.

Although it is described above that the present embodiment is applied to a hairpin winding type stator of a drive motor employed by an environment-friendly vehicle, the scope of the present disclosure is not limited thereto. It may be understood that the technical idea of the present disclosure may be applied to a drive motor of various types and uses employing a hairpin type stator.

Figure 2:
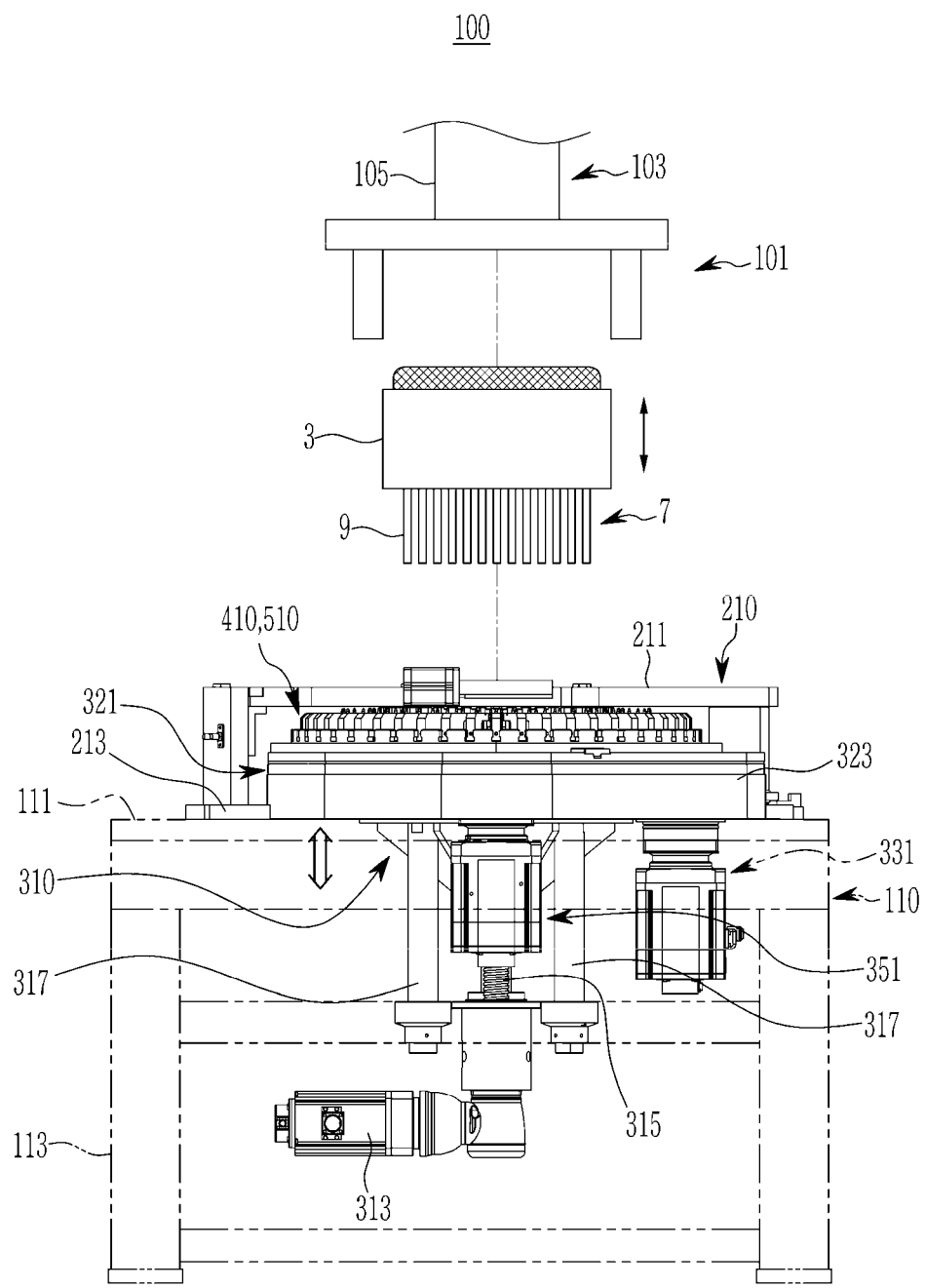
FIG. 2 is a front view of a widening apparatus for a hairpin-type stator coil according to an embodiment.

FIG. 2 is a front view of a widening apparatus for a hairpin-type stator coil according to an embodiment.

Referring to FIG. 1 and FIG. 2, a widening apparatus 100 for a hairpin-type stator coil according to an embodiment may be applied to the process of assembling the stator 1 of the hairpin winding type among the processes of assembling a drive motor.

In addition, the widening apparatus 100 for a hairpin-type stator coil according to an embodiment may be applied to the process of post-processing the stator coils 7 inserted into the slots 5 of the stator core 3, in the coil inserting process. These coil post-processing processes may include a coil widening process, a coil twisting process, and a coil welding process.

During the post-processing process, the widening apparatus 100 for a hairpin-type stator coil according to an embodiment may be applied to the coil widening process for extending a distance between end portions 9 of the stator coils 7 penetrating the slots 5 outward in the radial direction of the stator core 3.

In the coil widening process, the ends of the stator coils 7 are bent outward in the radial direction, and a process of extending the distance between the ends may be performed.

Hereinafter, the end portions of the stator coils 7 that penetrated the slots 5 of the stator core 3 are referred to as welding portions 9. The welding portions 9 of the stator coils 7 may be welded together in the welding process of the post-processing process.

The reason for extending the distance between the welding portions 9 of the stator coils 7 as described above is to secure an insulation distance between the welding portions 9 and to improve workability (welding properties) in the welding process.

In this specification, the alignment direction of the stator coils 7 sequentially inserted into the slots 5 from the outside to the inside in the radial direction of the stator core 3 may be defined as a layer direction.

In this specification, the position point of the stator coil 7 positioned on the outermost side of the radial direction is called a first layer, and the position points of the stator coils 7 positioned sequentially from the first layer toward the inner side of the radial direction may be called second, third, fourth, fifth, sixth, . . . , layers.

Furthermore, in this specification, "upper end portion", "upper portion", "upper end", or "upper portion surface" of a component indicates end portion, portion, end, or surface of the component that is relatively positioned higher in the drawing, and "lower end portion", "lower portion", "lower end", or "lower portion surface" of a component indicates end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

Meanwhile, in the coil widening process as described above, while gripping the stator core 3 by a core gripper 101, the distance between the welding portions 9 of the stator coils 7 may be extended by the widening apparatus 100 for a hairpin-type stator coil according to an embodiment.

Here, the core gripper 101 is mounted on a robot arm 105 of a robot 103 that is designed to move along a programmed preset trajectory.

The core gripper 101 is designed to grip the outer circumferential surface or the inner circumferential surface of the stator core 3, and is rotatable with respect to the robot arm 105. Various robots known to a person of an ordinary skill in the art may be used as the robot 103.

The widening apparatus 100 for a hairpin-type stator coil according to an embodiment is structured such that, in a simple configuration, the distance between the welding portions 9 of the stator coils 7 may be extended without replacing a tool even if the specification of the stator is changed.

Figure 3:
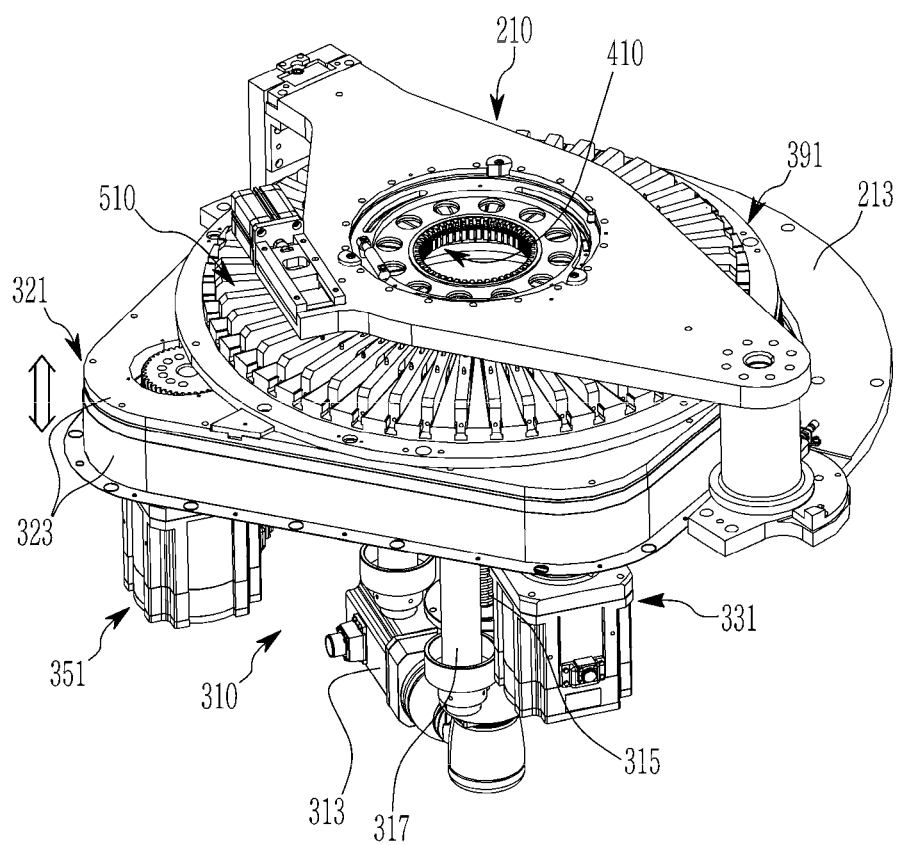
FIG. 3 is a perspective view of a widening apparatus for a hairpin-type stator coil according to an embodiment.
Figure 4:
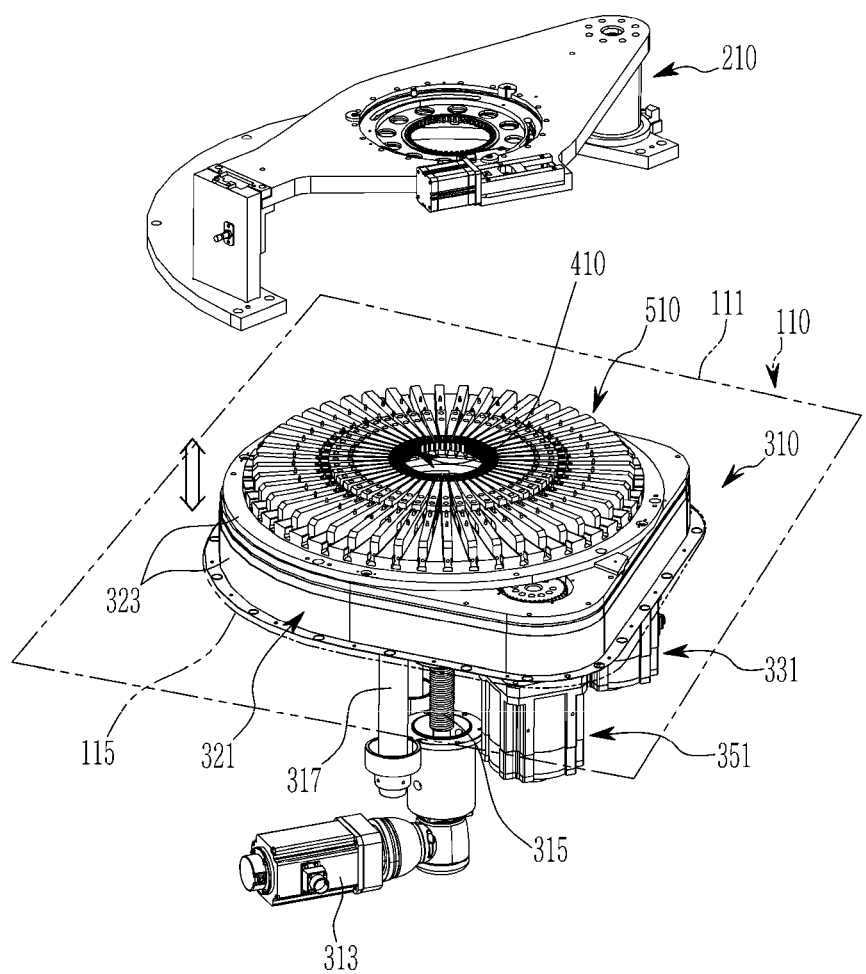
FIG. 4 is a partially exploded perspective view of a widening apparatus for a hairpin-type stator coil according to an embodiment.

FIG. 3 is a perspective view of a widening apparatus for a hairpin-type stator coil according to an embodiment, and FIG. 4 is a partially exploded perspective view of a widening apparatus for a hairpin-type stator coil according to an embodiment.

Referring to FIG. 1 to FIG. 4, the widening apparatus 100 for a hairpin-type stator coil according to an embodiment includes, a base frame 110, a coil support unit 210, a tool driving unit 310, a plurality of lower widening tools 410, and a plurality of upper widening tools 510.

In an embodiment, the base frame 110 is installed on the floor of a coil widening process work area. The base frame 110 is mounted with components to be described below.

In an example, the base frame 110 includes a base plate 111 spaced upward from the bottom of the process work area. In addition, the base frame 110 is provided with at least one support stand 113 coupled to a lower surface of the base plate 111 and extended downward.

In an embodiment, the coil support unit 210 is configured to support, at a radially outside of the stator core 3, the welding portions 9 of the stator coils 7 arranged in the layer direction in the slots 5 of the stator core 3 outside the radial direction of the stator core 3.

The coil support unit 210 is installed to be spaced apart by a preset interval upward with respect to an upper surface of the base plate 111 of the base frame 110.

Figure 5:
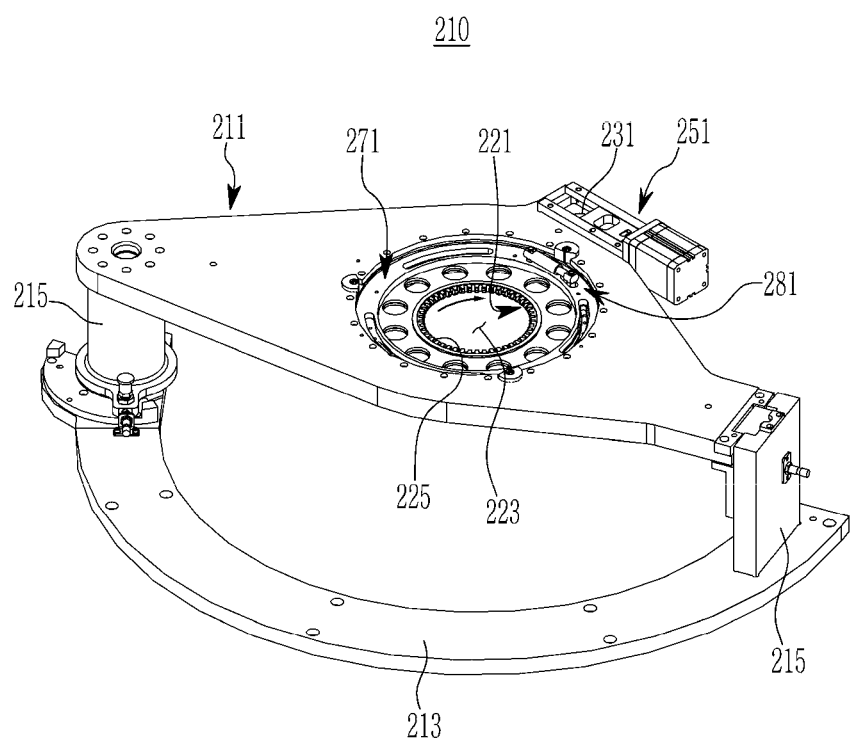
FIG. 5 is a perspective view of a coil support unit applied to a widening apparatus for a hairpin-type stator coil according to an embodiment.
Figure 6:
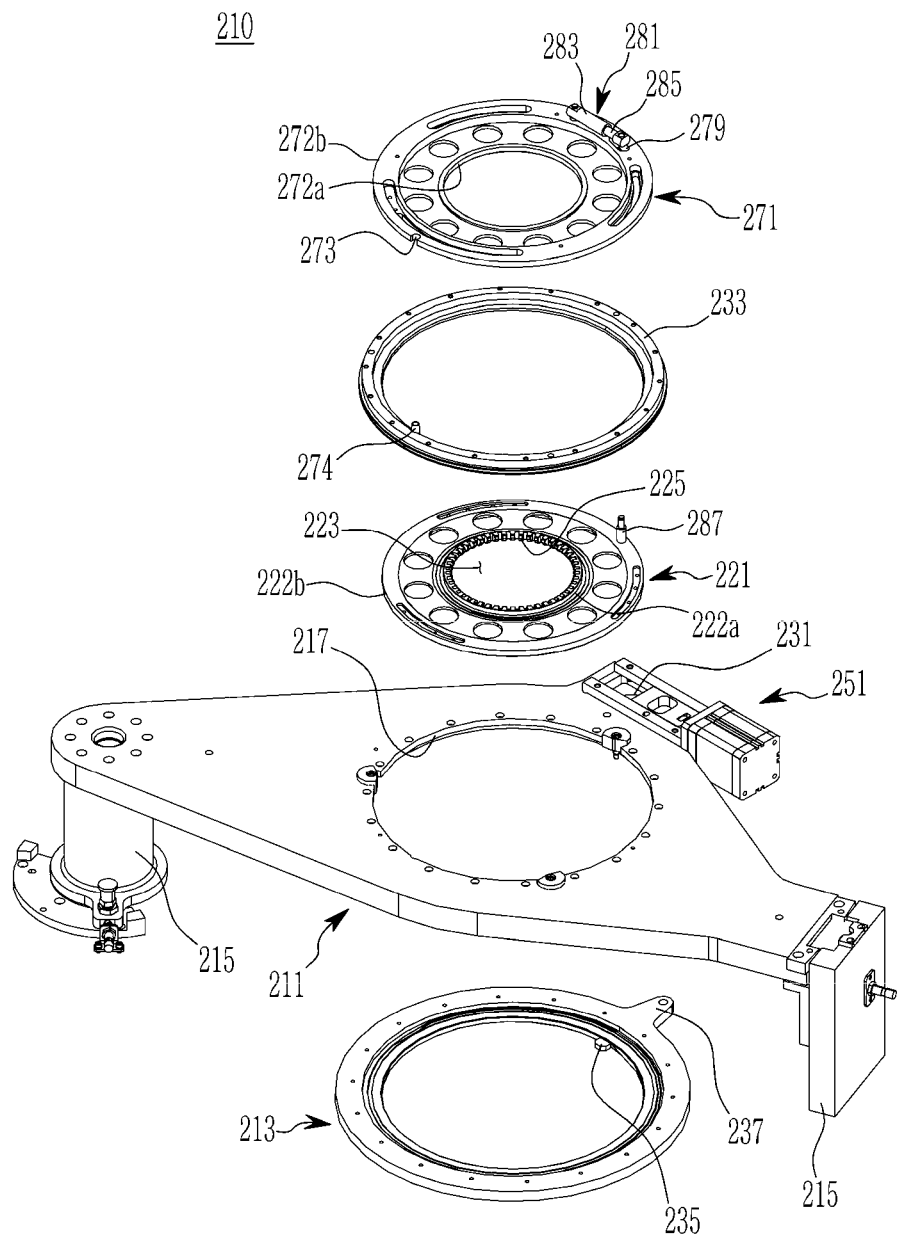
FIG. 6 is an exploded perspective view of a coil support unit applied to a widening apparatus for a hairpin-type stator coil according to an embodiment.

FIG. 5 is a perspective view of a coil support unit applied to a widening apparatus for a hairpin-type stator coil according to an embodiment, and FIG. 6 is an exploded perspective view of a coil support unit applied to a widening apparatus for a hairpin-type stator coil according to an embodiment.

Referring to FIG. 5 and FIG. 6, the coil support unit 210 according to an embodiment includes a support plate 211, a main support disk 221, a rotation member 231 (details shown in FIG. 9), an actuator 251, a sub support disk 271, and a stopper assembly 281.

As shown in FIG. 2, the support plate 211 is installed on the base frame 110 spaced apart from an upper surface of the base plate 111. The support plate 211 is fixed to the upper surface of the base plate 111 through a fixing bracket 213.

The support plate 211 is spaced apart from the upper surface of the base plate 111 by at least one supporting block 215 fixed to an upper surface of the fixing bracket 213. In an example, the supporting block 215 is fixed to both sides of the support plate 211, and extends downward to be fixed to the upper surface of the base plate 111.

Here, the support plate 211 includes an opening 217 configured to mount the main support disk 221 and the sub support disk 271. In an example, the opening 217 may be formed on the support plate 211 as a circular hole.

The main support disk 221 is rotatably installed on the opening 217 of the support plate 211.

In this specification, "disk" may be defined as an annular disk plate in which a disk hole is formed in the central portion. In the disk, an outer edge end may be defined as an outer circumferential end, and an inner edge end, which is an edge portion of the disk hole, may be defined as an inner circumferential end spaced radially inward from the outer circumferential end.

Figure 7:
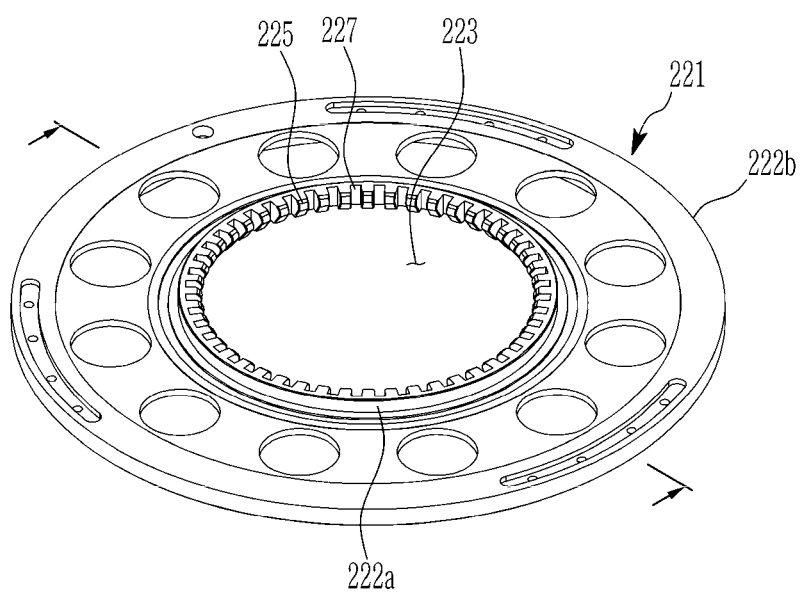
FIG. 7 is a top plan view of a main support disk of coil support unit applied to a widening apparatus for a hairpin-type stator coil according to an embodiment.
Figure 8:
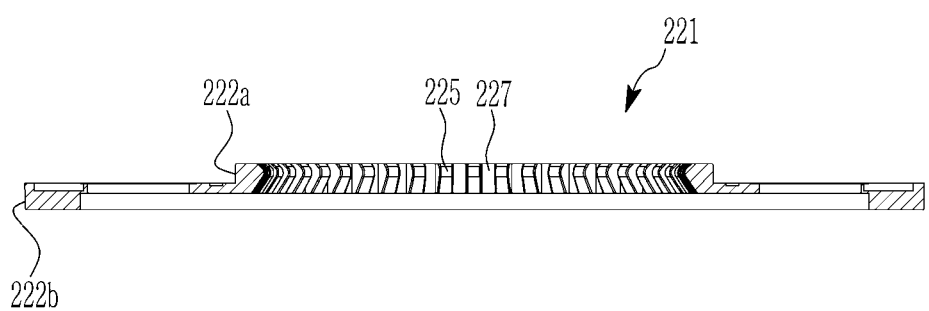
FIG. 8 is a cross-sectional view of a main support disk of coil support unit applied to a widening apparatus for a hairpin-type stator coil according to an embodiment.

The main support disk 221 is rotatably mounted on an inner circumferential surface of the opening 217 through an outer circumferential end 222b. As shown in FIG. 7 and FIG. 8, the main support disk 221 includes a disk hole 223 formed with an inner circumferential end 222a.

Here, the stator core 3 may be moved above the disk hole 223 by the core gripper 101. Accordingly, the stator coils 7 protruding from a lower end of the stator core 3 may be positioned in the disk hole 223.

The stator coils 7 are disposed radially inward from the inner circumferential end 222a in the layer direction. That is, the stator coils 7 are disposed according to a layer sequence from the inner circumferential end 222a.

In addition, the main support disk 221 includes a plurality of coil support ribs 225 extending radially inward from the inner circumferential end 222a. The plurality of coil support ribs 225 are disposed at a preset interval along the inner circumferential end 222a of the inner circumferential direction (edge direction).

Each of the plurality of coil support ribs 225 is configured to counteract the force received radially outward from the stator coils 7 by the plurality of lower widening tools 410 and the plurality of upper widening tools 510 to be later described in detail.

Furthermore, the main support disk 221 includes a plurality of coil guide grooves 227 formed between the plurality of coil support ribs 225. Each of the plurality of coil guide grooves 227 is configured to guide the stator coils 7 widened by the plurality of lower widening tools 410 and the plurality of upper widening tools 510.

Each of the plurality of coil guide grooves 227 is provided as a passage preventing the stator coils 7 from being caught by the coil support ribs 225 when the stator core 3 is moved from the above of the disk hole 223 to another position (for example, upward direction) by the core gripper 101.

The rotation member 231 is configured to rotate the main support disk 221 in the opening 217 of the support plate 211. In an example, the rotation member 231 may be a ring.

The rotation member 231 is rotatably coupled with a guide ring 233 fixed to the inner circumferential surface of the opening 217. The guide ring 233 may be rotatably coupled with an outer edge portion of the rotation member 231 through a groove and protrusion structure that is well known to a person of an ordinary skill in the art.

The rotation member 231 may be connected to a lower surface of the main support disk 221 by a connecting member 235. The rotation member 231 includes an extension portion 237 extending radially outward from an outer edge portion of rotation member 231.

The actuator 251 is configured to generate power, convert the power into a torque that rotates the main support disk 221, and transfer the torque to the main support disk 221.

That is, the actuator 251 is configured to rotate the main support disk 221 by a preset angle bidirectionally (for example, clockwise and counterclockwise) through the rotation member 231.

Figure 9:
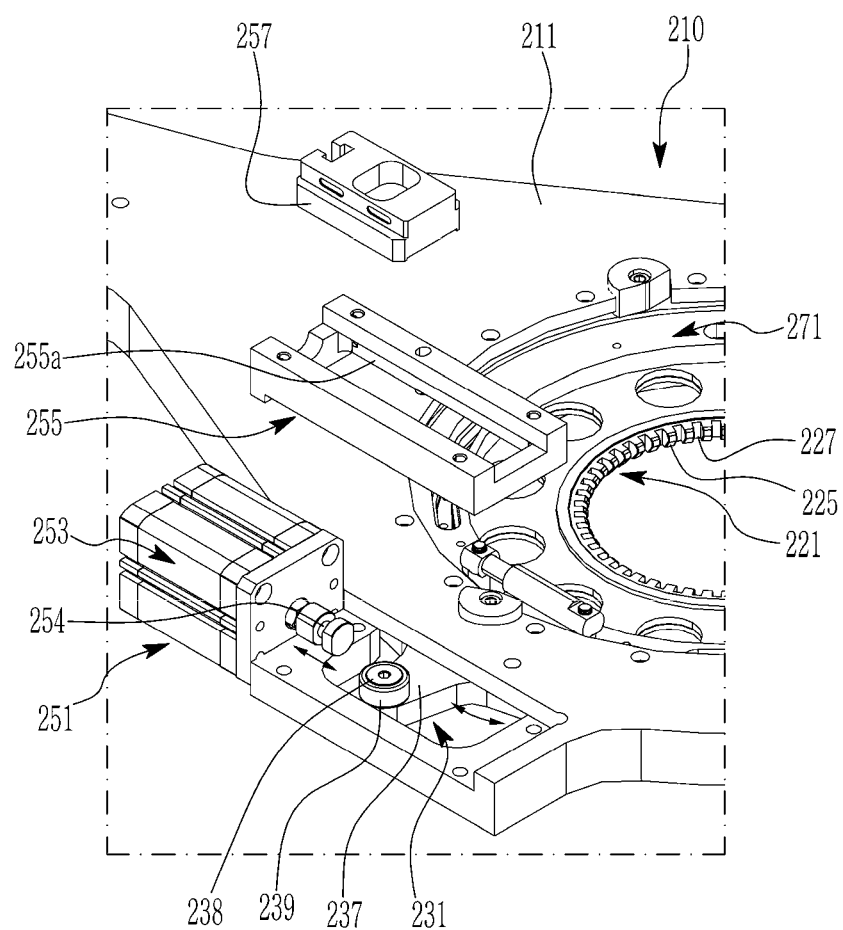
FIG. 9 is an exploded perspective view of an actuator of a coil support unit applied to a widening apparatus for a hairpin-type stator coil according to an embodiment.

As shown in FIG. 9, the actuator 251 includes an operation cylinder 253 installed on the support plate 211. In addition, the actuator 251 further includes a guide block 255 and a sliding block 257.

The operation cylinder 253 is operably connected to the extension portion 237 of the rotation member 231. In an example, the operation cylinder 253 may include a pneumatic cylinder known to a person of an ordinary skill in the art. The operation cylinder 253 is provided with an operation rod 254 movable forward and rearward by pneumatics.

The guide block 255 is fixed to the support plate 211. A guide rail 255a is formed in the guide block 255 along the length direction.

The sliding block 257 is coupled to the operation rod 254 of the operation cylinder 253. The sliding block 257 is slidably coupled to the guide rail 255a of the guide block 255.

Furthermore, the sliding block 257 is rotatably connected to the extension portion 237 of the rotation member 231. Specifically, a fixing pin 238 is fixed to the extension portion 237, and a bearing 239 is fixed to an outer circumferential surface of the fixing pin 238. An outer circumferential surface of the bearing 239 is fixed to the sliding block 257.

When the operation rod 254 of the operation cylinder 253 moves back and forth, the sliding block 257 moves back and forth along the guide rail 255a of the guide block 255.

At this time, since the sliding block 257 is rotatably connected to the extension portion 237 of the rotation member 231, the rotation member 231 is rotated bidirectionally, and thereby the main support disk 221 connected to the rotation member 231 may be rotated bidirectionally.

Referring to FIG. 5 and FIG. 6, the sub support disk 271 is configured to support an upper surface of the main support disk 221. The sub support disk 271 includes an inner circumferential end 272a and an outer circumferential end 272b.

An edge portion of the outer circumferential end 272b is fixed to the guide ring 233. At least one engagement hole 273 is formed on the edge portion of the outer circumferential end 272b. A coupling pin 274 fixed to the guide ring 233 is coupled with the engagement hole 273.

The inner circumferential end 272a of the sub support disk 271 has a greater diameter than the inner circumferential end 222a of the main support disk 221. Accordingly, the inner circumferential end 222a of the main support disk 221 is disposed inside the inner circumferential end 272a of the sub support disk 271.

The stopper assembly 281 is configured to limit a rotation angle of the main support disk 221 by the sub support disk 271. The stopper assembly 281 is installed on the sub support disk 271.

The stopper assembly 281 includes a cylinder body 283, a piston 285, and a stopper pin 287.

The cylinder body 283 is formed in a hollow rod shape that includes an outer circumferential surface and an inner circumferential surface, and is fixed to the sub support disk 271.

The piston 285 is positioned, at least in part, in the hollow portion in the cylinder body 283, and is movable in the length direction of the cylinder body 283. For this purpose, the shape of an inner circumferential surface of the cylinder body 283 may be similar to the shape of an outer circumferential surface of the piston 285. For smooth movement of the piston 285, a preset gap may be formed between the inner circumferential surface of the cylinder body 283 and the outer circumferential surface of the piston 285. The shape of the outer circumferential surface of the piston 285 may also have various shapes such as polygon, oval shape, circular shape, and the like.

The stopper pin 287 is fixed to the upper surface of the main support disk 221. The stopper pin 287 is upwardly connected to the edge portion of the outer circumferential end 222b of the main support disk 221.

The stopper pin 287 vertically passes through a guide slot 279 formed on the sub support disk 271 to be rotatably coupled with an end portion of the piston 285. The guide slot 279 has a length capable of determining the rotation angle of the main support disk 221 along the circumferential direction of the outer circumferential end 272b of the sub support disk 271.

Referring to FIG. 2 to FIG. 4, in an embodiment, the tool driving unit 310 is configured to operate the plurality of lower widening tools 410 and the plurality of upper widening tools 510 that will be further described later.

The tool driving unit 310 is disposed below the coil support unit 210, and installed on the base plate 111 of the base frame 110 to be vertically movable.

In an example, the tool driving unit 310 may move in the vertical direction by passing through a mounting hole 115 vertically penetrated into the base plate 111.

Figure 10:
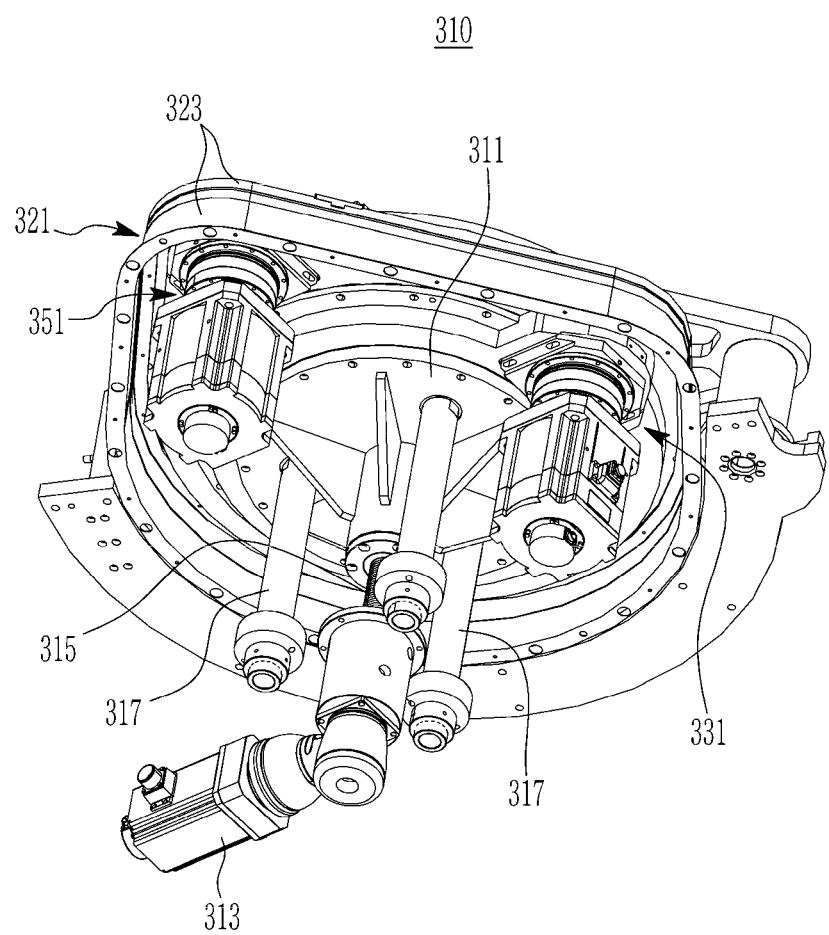
FIG. 10 is a perspective view of a tool driving unit applied to a widening apparatus for a hairpin-type stator coil according to an embodiment.
Figure 11:
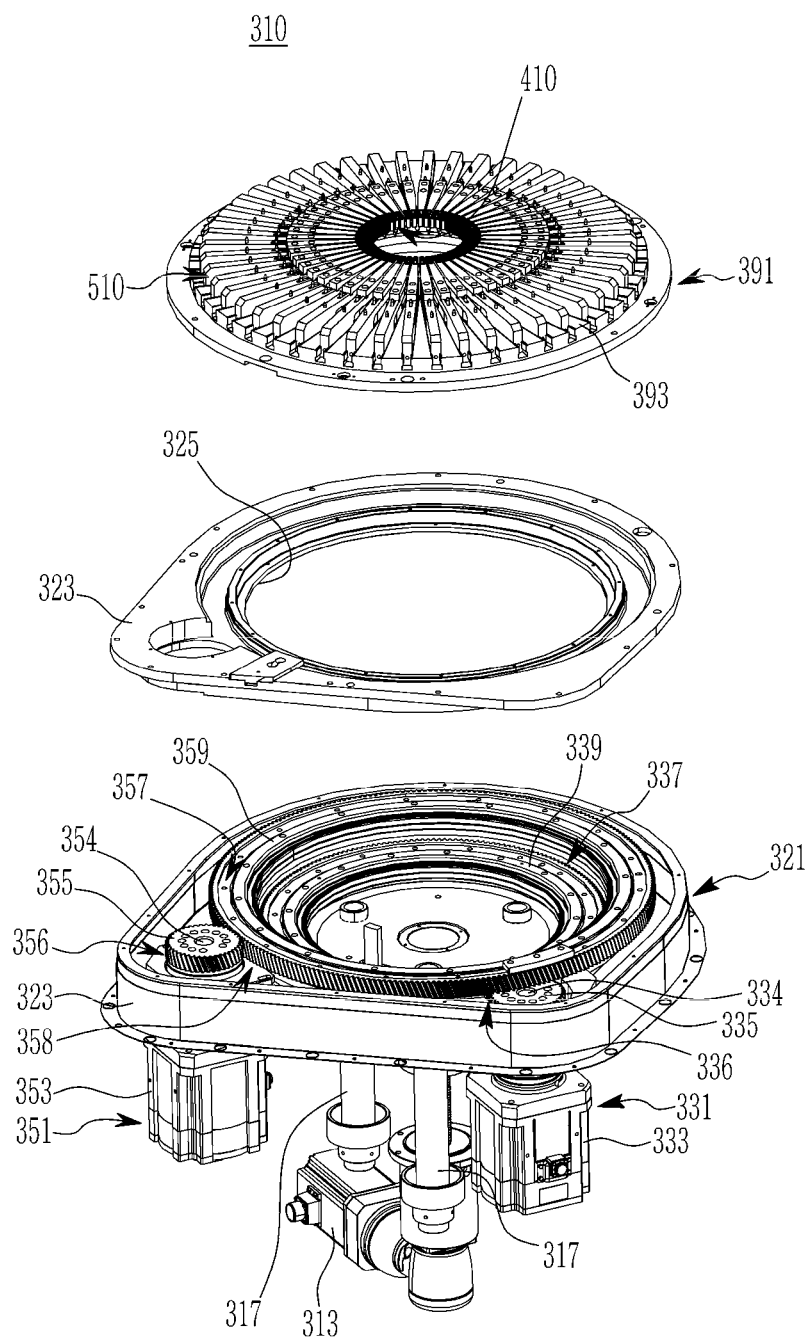
FIG. 11 is an exploded perspective view of a part of a tool driving unit applied to a widening apparatus for a hairpin-type stator coil according to an embodiment.
Figure 12:
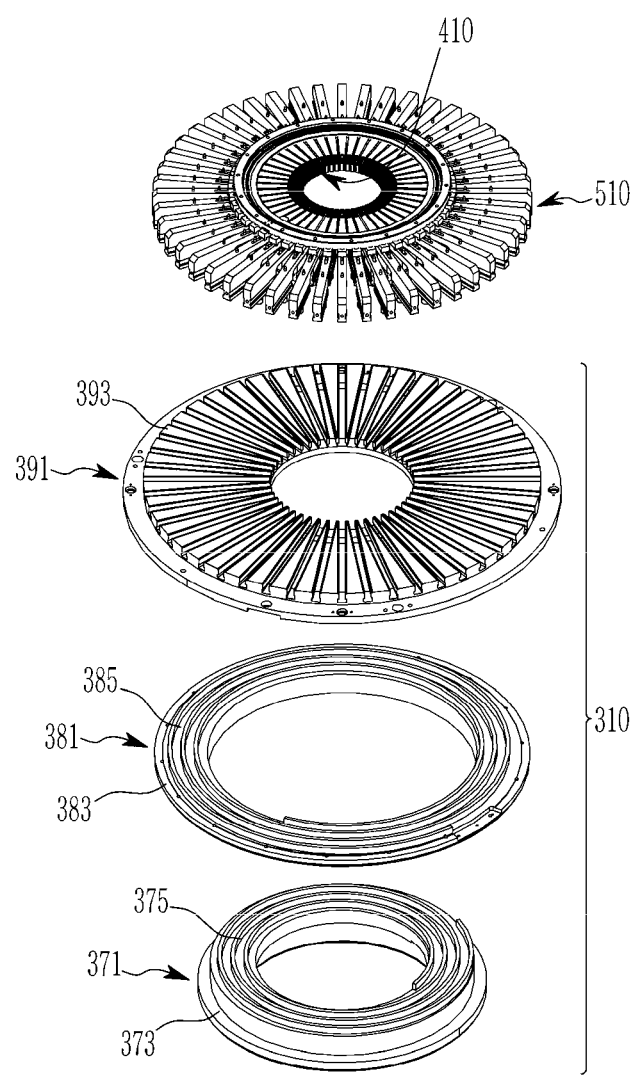
FIG. 12 is an exploded perspective view of another part of a tool driving unit applied to a widening apparatus for a hairpin-type stator coil according to an embodiment.

FIG. 10 is a perspective view of a tool driving unit applied to a widening apparatus for a hairpin-type stator coil according to an embodiment, FIG. 11 is an exploded perspective view of a part of a tool driving unit applied to a widening apparatus for a hairpin-type stator coil according to an embodiment, and FIG. 12 is an exploded perspective view of another part of a tool driving unit applied to a widening apparatus for a hairpin-type stator coil according to an embodiment.

Referring to FIG. 2 to FIG. 4, and FIG. 10 to FIG. 12, the tool driving unit 310 according to an embodiment includes a lifting member 311, a gear mounting member 321, a first gear operation part 331, a second gear operation part 351, a first movable rail disk 371, a second movable rail disk 381, and a fixed rail disk 391.

The lifting member 311 is installed on the base frame 110 to be vertically liftable. The lifting member 311 is connected to a first servo-motor 313 installed on a lower portion of the base frame 110.

The lifting member 311 may be moved in the vertical direction by driving the first servo-motor 313 capable of servo control of rotating direction and rotation speed. Such first servo-motor 313 capable of servo control of rotating direction and rotation speed is known to a person of an ordinary skill in the art, and is not described in further detail.

In an example, the lifting member 311 is screw-engaged to a ball screw 315 coupled to the first servo-motor 313, and installed on the base frame 110 to be vertically movable by at least one guide rod 317.

Accordingly, as the ball screw 315 is rotated bidirectionally by driving the first servo-motor 313, the lifting member 311 may be moved reciprocally in the vertical direction while being guided by the guide rod 317.

The gear mounting member 321 is fixedly mounted on a corresponding upper surface of the lifting member 311, and is reciprocally movable together with the lifting member 311 in the vertical direction. That is, the lifting member 311 is fixed to a lower surface of the gear mounting member 321. The gear mounting member 321 may move up and down in the vertical direction by the lifting member 311 by passing through the mounting hole 115 of the base plate 111.

Here, the gear mounting member 321 includes a gear mount case 323 capable of mounting the first gear operation part 331 and the second gear operation part 351 that will be further described later.

A lower surface of the gear mount case 323 is fixed to the upper surface of the lifting member 311, and an upper surface of the gear mount case 323 is formed with a mounting hole 325 where the first gear operation part 331 and the second gear operation part 351 are positioned.

Figure 13:
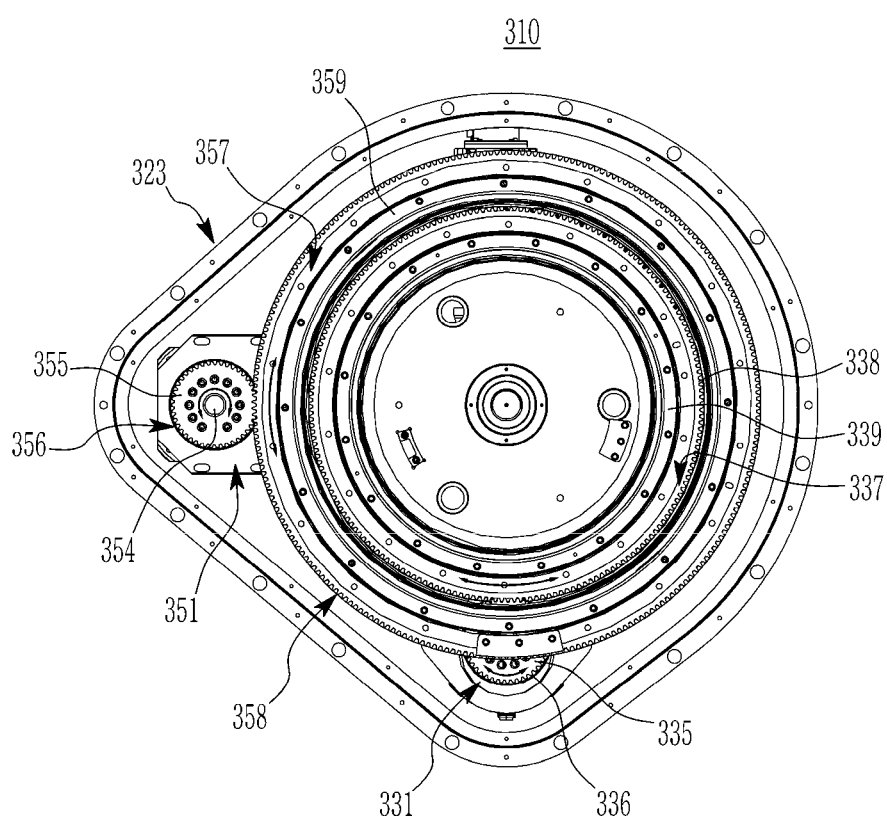
FIG. 13 illustrates first and second gear operation parts of a tool driving unit applied to a widening apparatus for a hairpin-type stator coil according to an embodiment.

FIG. 13 illustrates first and second gear operation parts of a tool driving unit applied to a widening apparatus for a hairpin-type stator coil according to an embodiment.

Referring to FIG. 11 and FIG. 13, the first gear operation part 331 includes a second servo-motor 333, a first drive gear 335, and a first driven gear 337.

The second servo-motor 333 is installed on a first side of the gear mount case 323. The second servo-motor 333 is a motor capable of servo control of rotating direction and rotation speed, and includes a first motor shaft 334 disposed along its axial direction of the vertical direction.

The first drive gear 335 is coupled to the first motor shaft 334. In an example, the first drive gear 335 is a disk gear, and first drive teeth 336 of a helical type are formed on an outer circumferential surface of the first drive gear 335.

The first driven gear 337 is rotatably mounted within an edge of the gear mount case 323. The first driven gear 337 is mounted within the edge of the gear mount case 323 by a first gear bearing 339 known to a person of an ordinary skill in the art.

In an example, the first driven gear 337 is a ring-shaped gear, and helical type first driven teeth 338 are formed on an outer circumferential surface of the first driven gear 337. The first driven teeth 338 may be engaged with the first drive teeth 336.

The second gear operation part 351 includes a third servo-motor 353, a second drive gear 355, and a second driven gear 357.

The third servo-motor 353 is positioned on the second side of the gear mount case 323. The third servo-motor 353 is a motor capable of servo control of rotating direction and rotation speed, and includes a second motor shaft 354 disposed along its axial direction of the vertical direction.

The second drive gear 355 is coupled to the second motor shaft 354. In an example, the second drive gear 355 is a disk gear, and second drive teeth 356 of a helical type are formed on an outer circumferential surface of the second drive gear 355.

The second driven gear 357 is rotatably mounted on the edge side of the gear mount case 323, while interiorly disposing the first driven gear 337. The second driven gear 357 is rotatably positioned on the edge side of the gear mount case 323 by a second gear bearing 359 known to a person of an ordinary skill in the art.

In an example, the second driven gear 357 is a ring-shaped gear, and helical type second driven teeth 358 are formed on an outer circumferential surface of the second driven gear 357. The second driven teeth 358 may be engaged with the second drive teeth 356.

Figure 14:
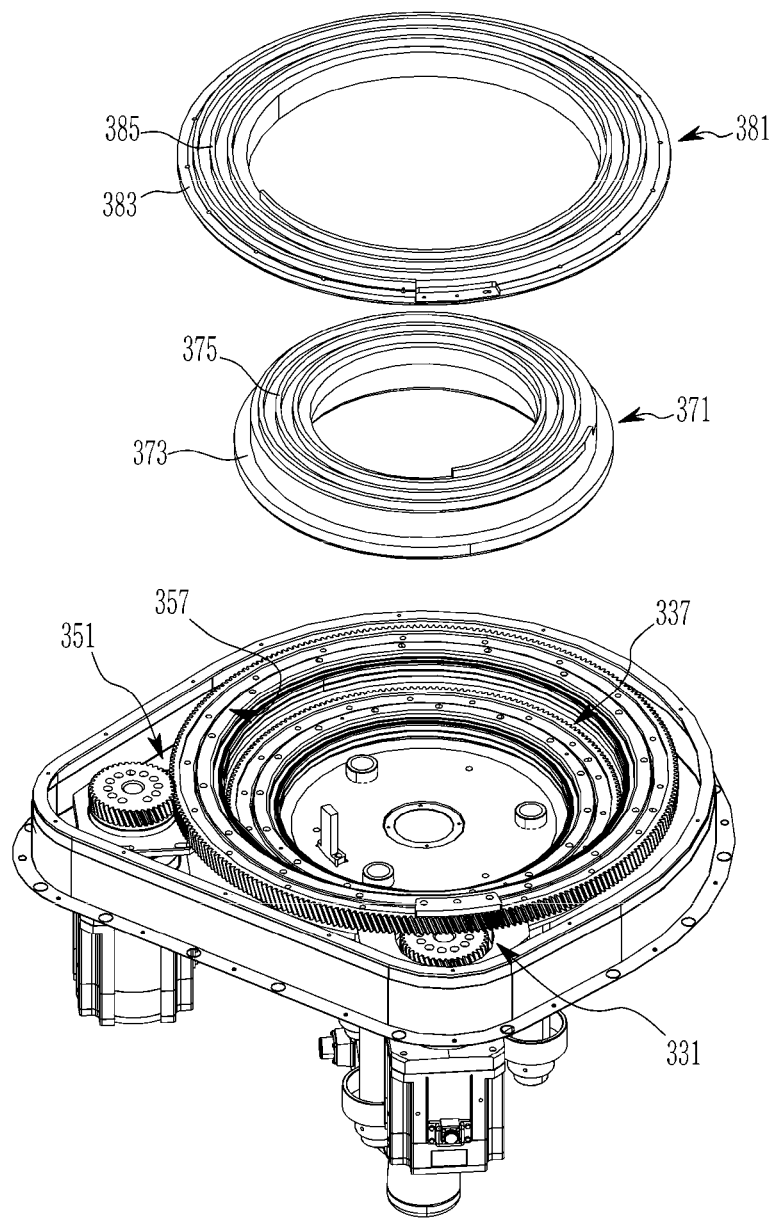
FIG. 14 illustrates first and second movable rail disks of a tool driving unit applied to a widening apparatus for a hairpin-type stator coil according to an embodiment.

FIG. 14 illustrates first and second movable rail disks of a tool driving unit applied to a widening apparatus for a hairpin-type stator coil according to an embodiment.

Referring to FIG. 12 and FIG. 14, the first movable rail disk 371 is operably connected to the first gear operation part 331. The first movable rail disk 371 is coupled to the first driven gear 337 through a first flange 373 formed on an outer edge portion. Accordingly, the first movable rail disk 371 may be rotated with the first driven gear 337.

A first cam follower rail 375 is formed on an upper surface of the first movable rail disk 371. In an example, the first cam follower rail 375 is formed in a spiral shape on the upper surface of the first movable rail disk 371. The first cam follower rail 375 may be defined by rail grooves of a spiral shape.

The second movable rail disk 381 is operably connected to the second gear operation part 351. The second movable rail disk 381 is coupled to the second driven gear 357 through a second flange 383 formed to outer edge portion of the second movable rail disk 381. Accordingly, the second movable rail disk 381 may be rotated with the second driven gear 357.

A second cam follower rail 385 is formed on an upper surface of the second movable rail disk 381. In an example, the second cam follower rail 385 is formed in a spiral shape on the upper surface of the second movable rail disk 381. The second cam follower rail 385 may be defined by rail grooves of a spiral shape.

Figure 15:
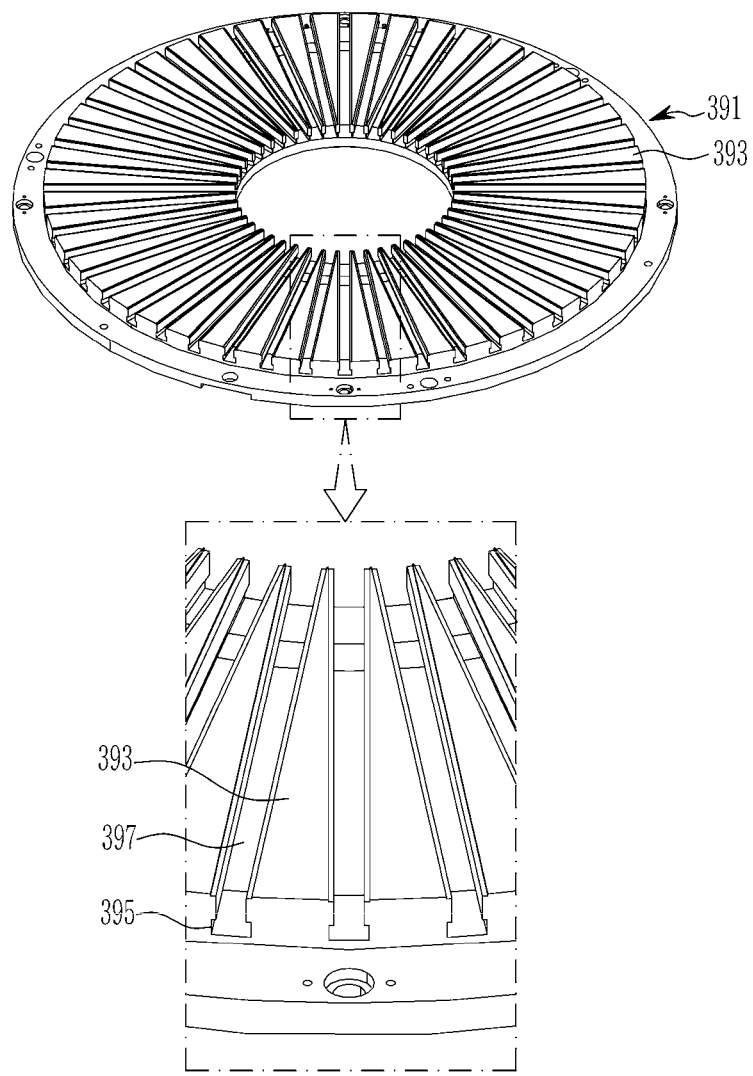
FIG. 15 illustrates a fixed rail disk of a tool driving unit applied to a widening apparatus for a hairpin-type stator coil according to an embodiment.

FIG. 15 illustrates a fixed rail disk of a tool driving unit applied to a widening apparatus for a hairpin-type stator coil according to an embodiment.

Referring to FIG. 11, FIG. 12, and FIG. 15, the fixed rail disk 391 is fixed to the upper surface of the gear mount case 323 of the gear mounting member 321, disposing the first movable rail disk 371 and the second movable rail disk 381 below.

A plurality of guide rails 393 are formed on an upper surface of the fixed rail disk 391 in the radial direction. The plurality of guide rails 393 are formed on the upper surface of the fixed rail disk 391 apart from each other at a preset interval along the circumferential direction.

A rail groove 395 radially extending from an outer edge to an inner edge of the fixed rail disk 391 is formed in each of the plurality of guide rails 393. In addition, a rail hole 397 is formed between the plurality of guide rails 393 to vertically penetrate the fixed rail disk 391, corresponding to the first cam follower rail 375 of the first movable rail disk 371 and the second cam follower rail 385 of the second movable rail disk 381.

Referring to FIG. 3, FIG. 4, FIG. 11, and FIG. 12, in an embodiment, the plurality of lower widening tools 410 and the plurality of upper widening tools 510 are configured to grip the welding portions 9 of the stator coils 7 supported by the coil support unit 210 by at least one layer.

In addition, the plurality of lower widening tools 410 and the plurality of upper widening tools 510 are configured to bend the gripped welding portions 9 radially outward, to extend distance between end portions of the welding portions 9.

The plurality of lower widening tools 410 and the plurality of upper widening tools 510 are coupled to the guide rails 393 of the fixed rail disk 391 to be reciprocally moveable along the layer direction of the stator coils 7. Here, the plurality of upper widening tools 510 may reciprocally move above the plurality of lower widening tools 410.

In addition, the plurality of lower widening tools 410 are operably connected to the first gear operation part 331 and the first movable rail disk 371. In addition, the plurality of upper widening tools 510 are operably connected to the second gear operation part 351 and the second movable rail disk 381. Furthermore, the plurality of lower widening tools 410 and the plurality of upper widening tools 510 may be moved in the vertical direction by the tool driving unit 310.

Figure 16:
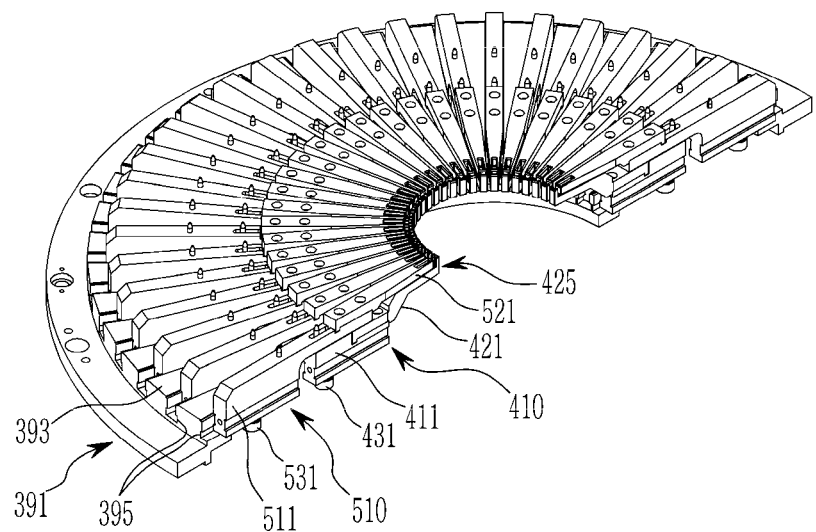
FIG. 16 is a perspective view of a lower widening tool and an upper widening tool applied to a widening apparatus for a hairpin-type stator coil according to an embodiment.
Figure 17:
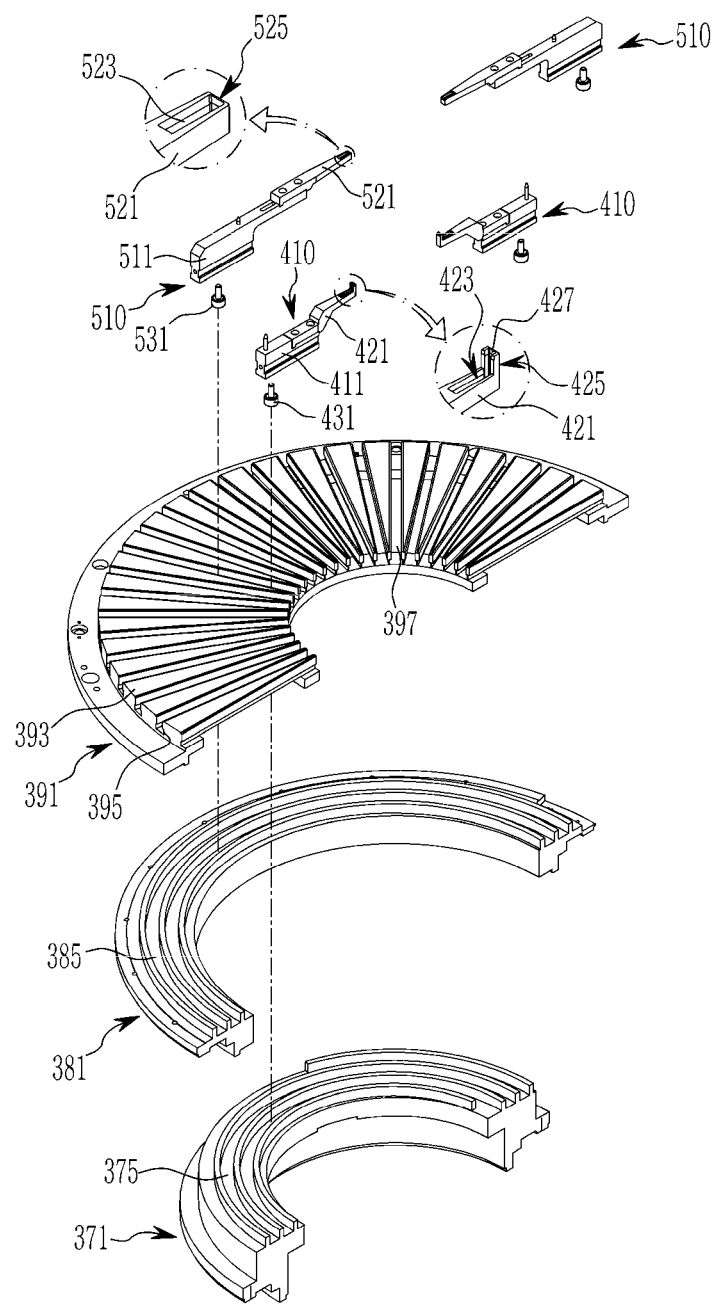
FIG. 17 is an exploded perspective view of a lower widening tool and an upper widening tool applied to a widening apparatus for a hairpin-type stator coil according to an embodiment.
Figure 18:
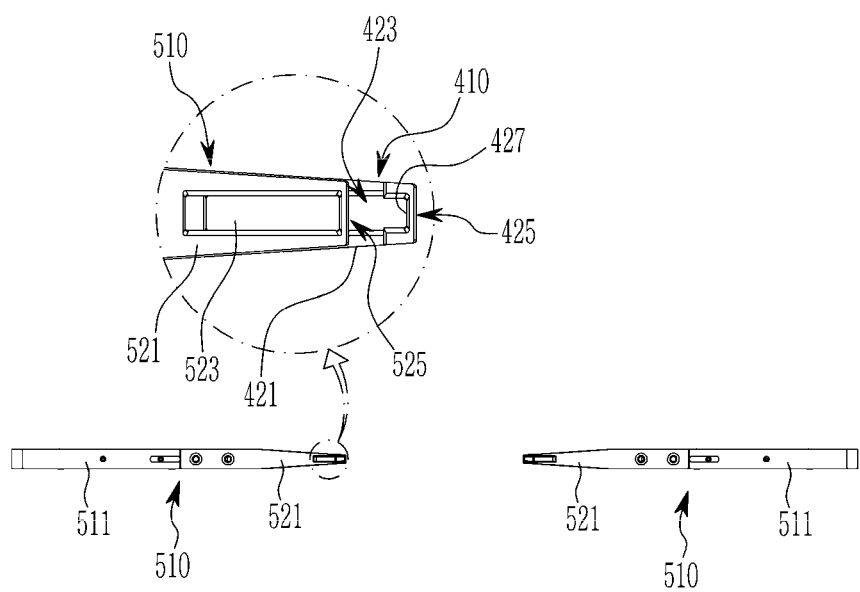
FIG. 18 is a top plan view of a lower widening tool and an upper widening tool applied to a widening apparatus for a hairpin-type stator coil according to an embodiment.

FIG. 16 is a perspective view of a lower widening tool and an upper widening tool applied to a widening apparatus for a hairpin-type stator coil according to an embodiment, FIG. 17 is an exploded perspective view of a lower widening tool and an upper widening tool applied to a widening apparatus for a hairpin-type stator coil according to an embodiment, and FIG. 18 is a top plan view of a lower widening tool and an upper widening tool applied to a widening apparatus for a hairpin-type stator coil according to an embodiment.

Referring to FIG. 16 to FIG. 18, each of the plurality of lower widening tools 410 includes a first tool body 411, a lower coil gripper 421, and a first cam robe 431.

The first tool body 411 is coupled to the rail groove 395 of the guide rails 393 of the fixed rail disk 391 to be radially slidable, and disposed between and radially interior to the guide rails 393.

The lower coil gripper 421 is configured to grip the welding portion 9 of the stator coil 7 of at least one layer. In an example, the lower coil gripper 421 may grip the welding portions 9 of the stator coils 7 of two layers. The lower coil gripper 421 is coupled to the first tool body 411, and forms a first coil support hole 423 that is vertically penetrated.

Furthermore, the lower coil gripper 421 includes a coil supporting portion 425 vertically elongated at a radially interior end of the lower coil gripper 421. A coil support groove 427 connected to the first coil support hole 423 in the coil supporting portion 425 in the vertical direction.

The first cam robe 431 is coupled to a lower surface of the first tool body 411, and vertically passes through the rail hole 397 between the guide rails 393 to be inserted into the first cam follower rail 375 of the first movable rail disk 371. The first cam robe 431 may slide along the first cam follower rail 375.

Each of the plurality of upper widening tools 510 includes a second tool body 511, an upper coil gripper 521, and a second cam robe 531.

The second tool body 511 is coupled to the rail groove 395 of the guide rails 393 of the fixed rail disk 391 to be radially slidable, and disposed between the guide rails 393 and radially exterior to the first tool body 411.

The upper coil gripper 521 is configured to grip the welding portion 9 of the stator coil 7 of at least one layer, separately from the lower coil gripper 421. In an example, the upper coil gripper 521 may grip the welding portions 9 of the stator coils 7 of two layers. The upper coil gripper 521 is coupled to the second tool body 511 above the lower coil gripper 421, and forms a second coil support hole 523 connected to the first coil support hole 423.

Furthermore, the upper coil gripper 521 includes a coil pressing part 525 formed at a radially interior end of the upper coil gripper 521 and configured to pressurize the stator coils 7 inserted into the first coil support hole 423. The coil pressing part 525 may pressurize the stator coils 7 from above the lower coil gripper 421.

The second cam robe 531 is coupled to a lower surface of the second tool body 511, and vertically passes through the rail hole 397 between the guide rails 393 to be inserted into the second cam follower rail 385 of the second movable rail disk 381. The second cam robe 531 may slide along the second cam follower rail 385.

Hereinafter, an operation of the widening apparatus 100 for a hairpin-type stator coil according to an embodiment is described in detail with reference to FIG. 1 to FIG. 18, and other accompanying drawings.

First, the core gripper 101 grips the stator core 3 into which the stator coils 7 are inserted by layers, and transfers the gripped stator core 3 to a preset position.

At this time, the stator core 3 may be positioned above the disk hole 223 of the main support disk 221 by the robot arm 105 of the robot 103 moving along the preset trajectory.

The stator coils 7 protruding from the lower end of the stator core 3 are disposed in positions corresponding to the coil support ribs 225 inside the disk hole 223. The stator coils 7 are disposed radially inward from the coil support ribs 225 along the layer direction.

The lower widening tools 410 and the upper widening tools 510 are moved downward together with the tool driving unit 310 by the driving of the first servo-motor 313. The lower widening tools 410 and the upper widening tools 510 may be positioned below the welding portions 9 of the stator coils 7.

Here, when the ball screw 315 is rotated in a forward direction by driving the first servo-motor 313, the lifting member 311 is guided by the guide rod 317 and moves downward, thereby moving the entire tool driving unit 310 downward.

Further, the lower widening tools 410 are moved forward and radially inward between the guide rails 393 of the fixed rail disk 391 by an action as described below.

When the first motor shaft 334 of the second servo-motor 333 rotates forward, the first driven gear 337 receives a torque from the first drive gear 335 and rotates in a first direction (for example, clockwise) together with the first movable rail disk 371.

When the first movable rail disk 371 rotates, the first cam robe 431 may slide along the first cam follower rail 375 of the first movable rail disk 371, to move the lower widening tools 410 forward and radially inward.

In addition, the upper widening tools 510 are moved backward and radially outward between the guide rails 393 of the fixed rail disk 391, by an action as described below.

When the second motor shaft 354 of the third servo-motor 353 rotates backward, the second driven gear 357 receives a torque from the second drive gear 355 and rotates in a second direction (for example, anticlockwise) together with the second movable rail disk 381.

When the second movable rail disk 381 rotates, the second cam robe 531 may slide along the second cam follower rail 385 of the second movable rail disk 381, to move the upper widening tools 510 backward and radially outward.

Figure 19A:
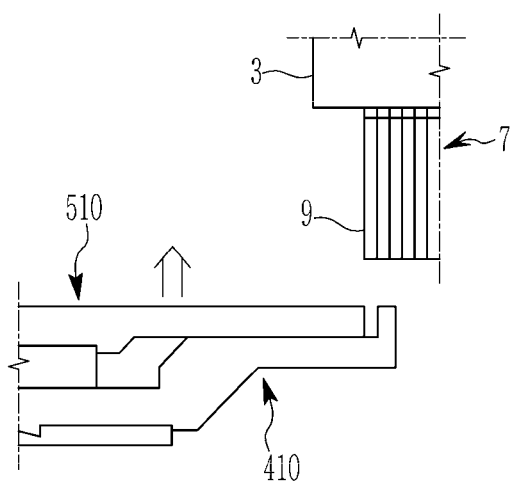
FIGS. 19A, 19B, 19C, 20A, 20B, and 21 respectively illustrate an operation of a widening apparatus for a hairpin-type stator coil according to an embodiment.

In such a state, when the ball screw 315 rotates backward by the operation of the first servo-motor 313, the lifting member 311 is guided by the guide rod 317 to move upward, to move the entire tool driving unit 310 upward by a preset distance. Then, as shown in FIG. 19A, the lower widening tools 410 and the upper widening tools 510 move upward together with the tool driving unit 310.

Figure 19B:
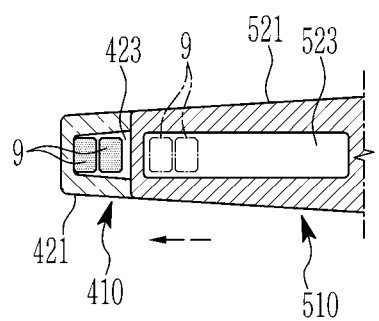

Accordingly, as shown in FIG. 19B, among the welding portions 9 of the stator coils 7, the welding portions 9 of two layers (for example, first and second layers) are inserted into the first coil support hole 423 of the lower coil gripper 421 of the lower widening tools 410 in the vertical direction.

Then, when the second motor shaft 354 of the third servo-motor 353 rotates forward, the second driven gear 357 receives a torque from the second drive gear 355 and rotates in the first direction (for example, clockwise) together with the second movable rail disk 381.

Figure 19C:
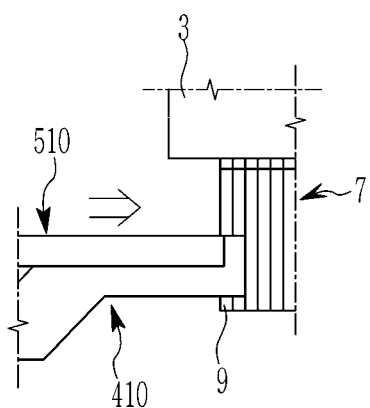

When the second movable rail disk 381 rotates, the second cam robe 531 may slide along the second cam follower rail 385 of the second movable rail disk 381, to move the upper widening tools 510 forward and radially inward (refer to FIG. 19C).

As the upper widening tools 510 move forward, the coil pressing part 525 of the upper coil gripper 521 pressurizes the welding portions 9 inserted into the first coil support hole 423 of the lower coil gripper 421, radially inward.

The welding portions 9 pressurized by the coil pressing part 525 tight contact each other without a gap in the first coil support hole 423 toward the coil support groove 427 of the coil supporting portion 425 of the lower coil gripper 421.

Figure 20A:
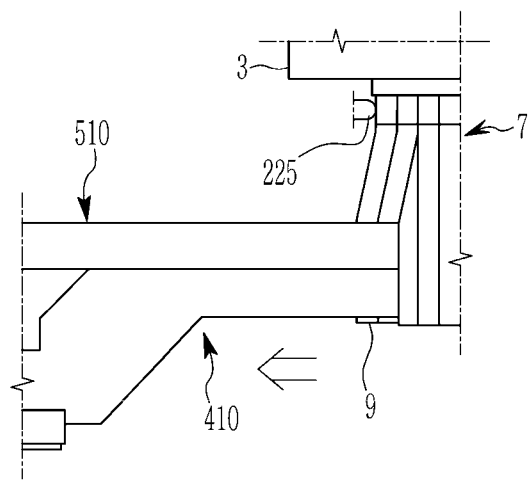

Subsequently, as shown in FIG. 20A, the lower widening tools 410 and the upper widening tools 510 simultaneously move backward along the guide rails 393 of the fixed rail disk 391, by an action as described below.

When the first motor shaft 334 of the second servo-motor 333 rotate backward, the first driven gear 337 receives a torque from the first drive gear 335 and rotates in the second direction (for example, anticlockwise) together with the first movable rail disk 371.

When the first movable rail disk 371 rotates, the first cam robe 431 may slide along the first cam follower rail 375 of the first movable rail disk 371, to move the lower widening tools 410 backward and radially outward.

Simultaneously, When the second motor shaft 354 of the third servo-motor 353 rotates backward, the second driven gear 357 receives a torque from the second drive gear 355 and rotates in the second direction (for example, anticlockwise) together with the second movable rail disk 381.

Figure 20B:
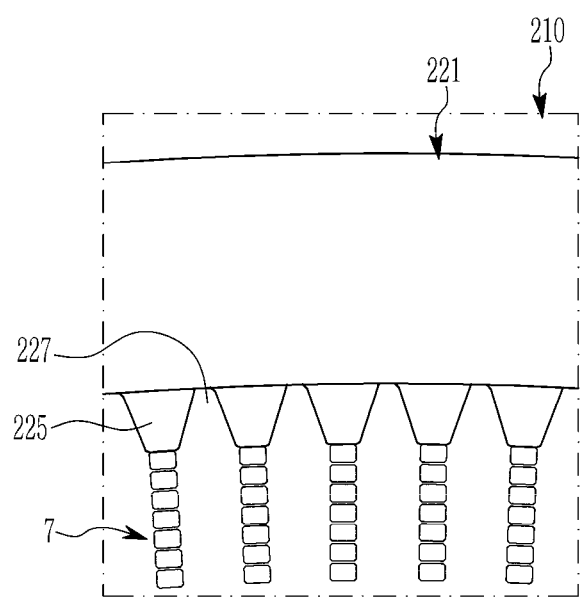

When the second movable rail disk 381 rotates, the second cam robe 531 may slide along the second cam follower rail 385 of the second movable rail disk 381, to move the upper widening tools 510 backward and radially outward At this time, as shown in FIG. 20B, the coil support ribs 225 of the main support disk 221 is supporting the stator coil 7 of the outermost layer (first layer) among the stator coils 7.

Therefore, the lower widening tools 410 and the upper widening tools 510 bends the welding portions 9 fixed the first coil support hole 423 of the lower coil gripper 421 by the upper coil gripper 521 radially outward with reference to the coil support ribs 225.

Here, the coil support ribs 225 may counteract the force received radially outward from the stator coils 7 by the lower widening tools 410 and the upper widening tools 510.

Furthermore, the main support disk 221 is in a state having its upper surface being supported by the sub support disk 271, and may counteract the force received radially outward from the stator coils 7.

Thereby, the lower widening tools 410 and the upper widening tools 510 bend the welding portions 9 of the two layers (the first and second layers) radially outward, and the distance between the welding portions 9 of the two layers and the welding portions 9 of other layers may be extended.

Meanwhile, the widening apparatus 100 for a hairpin-type stator coil according to an embodiment repeats the series of processes described above, to sequentially bend the welding portions 9 of other layers, and therefore, the distance between the welding portions 9 may be extended.

In this process, the second coil support hole 523 of the upper coil gripper 521 of the upper widening tools 510 may avoid interference with the already bent welding portions 9. When the lower widening tools 410 and the upper widening tools 510 move up and down, the already bent welding portions 9 may pass through the second coil support hole 523.

Figure 21:
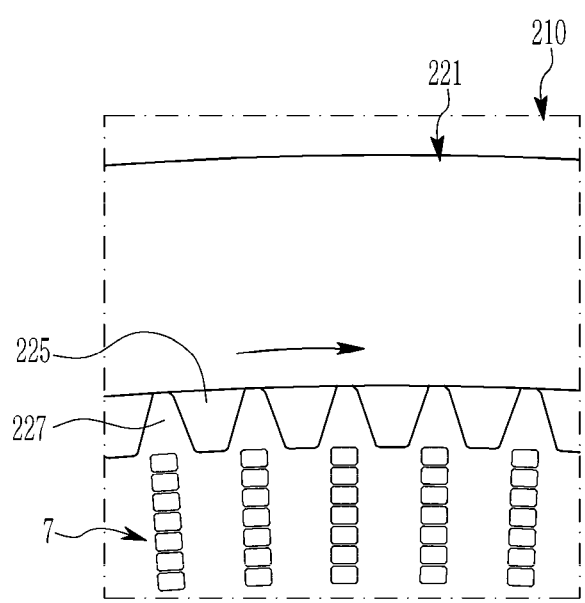

On the other hand, as shown in FIG. 21, while the welding portions 9 of the stator coils 7 in entire layers are all bent, the main support disk 221 is rotated by the preset angle in one direction (for example, clockwise or anticlockwise) by the actuator 251.

The operation cylinder 253 of the actuator 251 moves the operation rod 254 forward or backward by a preset distance, and moves the sliding block 257 forward and backward along the guide rail 255a of the guide block 255.

Then, since the sliding block 257 is rotatably connected to the extension portion 237 of the rotation member 231 through the bearing 239, the rotation member 231 may be rotate in the first direction by the preset angle together with the main support disk 221.

Here, the rotation angle of the main support disk 221 may be limited by the stopper assembly 281. When the main support disk 221 rotates, the stopper pin 287 may be stopped in the guide slot 279 of the sub support disk 271, and the piston 285 connected to the stopper pin 287 may move in the length direction of the cylinder body 283 by a preset distance.

Accordingly, the coil guide grooves 227 of the main support disk 221 are disposed in positions corresponding to the stator coils 7. At this time, the coil support ribs 225 of the main support disk 221 may be positioned between the stator coils 7 along the circumferential direction of the stator core 3.

Therefore, when the core gripper 101 is moved upward by the robot arm 105 of the robot 103 to move the stator core 3 upward, the bent welding portions 9 may pass through the coil guide grooves 227. When the stator core 3 moves upward, the coil guide grooves 227 of the main support disk 221 may avoid interference with the bent welding portions 9.

The widening apparatus 100 for a hairpin-type stator coil according to an embodiment described above may extend the distance between the welding portions 9 of the stator coils 7 by the lower widening tool 410 and the upper widening tool 510.

In addition, when the specification of the stator is changed, the widening apparatus 100 for a hairpin-type stator coil may grip the welding portions 9 by the lower widening tool 410 and the upper widening tool 510 regardless of design dimension of the stator coils 7.

Therefore, the widening apparatus 100 for a hairpin-type stator coil according to an embodiment do not require replacement of tools depending on the specifications of the stator, and it is possible to secure production flexibility for multi-type stators, shorten the process cycle time, and reduce equipment investment costs.

Furthermore, the widening apparatus 100 for a hairpin-type stator coil according to an embodiment may grip the welding portions 9 without a gap by the lower widening tool 410 and the upper widening tool 510, and therefore it is possible to minimize the occurrence of quality defects in widening the welding portions 9.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A widening apparatus for a hairpin-type stator coil configured to extend a distance between welding portions of hairpin-type stator coils inserted into slots of a stator core, the widening apparatus comprising:
   a coil support unit positioned on a base frame;
   a tool driving unit positioned on the base frame to be vertically movable below the coil support unit, wherein the tool driving unit is connected to a first gear operation part and a second gear operation part;
   a plurality of lower widening tools operably connected to the first gear operation part, and reciprocally movable along a layer direction of the stator coils; and
   a plurality of upper widening tools operably connected to the second gear operation part, and configured to be reciprocally movable above the plurality of lower widening tools,
   wherein the coil support unit comprises:
   a support plate positioned on the base frame spaced apart from an upper surface of the base frame; and
   a main support disk rotatably positioned in an opening formed on the support plate and having a disk hole where the stator coils are positioned, wherein a plurality of coil support ribs are formed on an edge of the disk hole, and
   wherein each of the plurality of coil support ribs extend radially inward from an edge of the disk hole, and are configured to counteract a force received radially outward from the stator coils by the plurality of lower widening tools and the plurality of upper widening tools.

2. The widening apparatus of claim 1, wherein the main support disk comprises a coil guide groove formed between the plurality of coil support ribs.

3. A widening apparatus for a hairpin-type stator coil configured to extend a distance between welding portions of hairpin-type stator coils inserted into slots of a stator core, the widening apparatus comprising:
a coil support unit positioned on a base frame;
a tool driving unit positioned on the base frame to be vertically movable below the coil support unit, wherein the tool driving unit is connected to a first gear operation part and a second gear operation part;
a plurality of lower widening tools operably connected to the first gear operation part, and reciprocally movable along a layer direction of the stator coils; and
a plurality of upper widening tools operably connected to the second gear operation part, and configured to be reciprocally movable above the plurality of lower widening tools;
wherein the coil support unit comprises:
a support plate positioned on the base frame spaced apart from an upper surface of the base frame; and
a main support disk rotatably positioned in an opening formed on the support plate and having a disk hole where the stator coils are positioned, wherein a plurality of coil support ribs are formed on an edge of the disk hole:
wherein the coil support unit further comprises: a rotation member having a ring shape and rotatably coupled with a guide ring fixed to an edge of the opening, and connected to the main support disk; and an actuator positioned on the support plate and configured to rotate the main support disk by a preset angle bidirectionally through the rotation member.

4. The widening apparatus of claim 3, wherein the actuator comprises an operation cylinder positioned on the support plate, and wherein the actuator is operably connected to an extension portion extending radially outward from an edge of the rotation member.

5. The widening apparatus of claim 3, wherein the coil support unit further comprises:
a sub support disk fixed to the guide ring and configured to support an upper surface of the main support disk; and
a stopper assembly positioned on the sub support disk and configured to limit a rotation angle of the main support disk.

6. The widening apparatus of claim 5, wherein the stopper assembly comprises:
a cylinder body fixed to the sub support disk;
a piston coupled to the cylinder body, and movable in a length direction of the cylinder body; and
a stopper pin that is fixed to the main support disk, passes through a guide slot formed on the sub support disk, and is rotatably coupled with the piston.

7. A widening apparatus for a hairpin-type stator coil configured to extend a distance between welding portions of hairpin-type stator coils inserted into slots of a stator core, the widening apparatus comprising: a coil support unit positioned on a base frame, a tool driving unit positioned on the base frame to be vertically movable below the coil support unit, and including a first gear operation part and a second gear operation part; a plurality of lower widening tools operably connected to the first gear operation part, and reciprocally movable along a layer direction of the stator coils; and a plurality of upper widening tools operably connected to the second gear operation part, and configured to be reciprocally movable above the plurality of lower widening tools;
wherein the tool driving unit comprises:
a lifting member connected to a first servo-motor positioned on the base frame, and configured to be vertically liftable under the coil support unit;
a gear mounting member fixed on the lifting member, connected to the first gear operation part and the second gear operation part;
a first movable rail disk operably connected to the first gear operation part, and forming a first cam follower rail on an upper surface of the first movable rail disk; and a second movable rail disk operably connected to the second gear operation part, and forming a second cam follower rail on an upper surface of second movable rail disk.

8. The widening apparatus of claim 7, wherein the lifting member is fixed to a lower surface of the gear mounting member, positioned on the base frame to be vertically movable by at least one guide rod, and wherein the lifting member is engaged with a ball screw coupled to the first servo-motor.

9. The widening apparatus of claim 7, wherein the first gear operation part comprises:
a second servo-motor positioned on the gear mounting member;
a first drive gear coupled to motor shaft of the second servo-motor; and
a first driven gear rotatably mounted within an edge of the gear mounting member and engaged with the first drive gear.

10. The widening apparatus of claim 9, wherein:
the first movable rail disk is coupled to the first driven gear through a first flange; and
the first cam follower rail has a spiral shape.

11. The widening apparatus of claim 9, wherein the second gear operation part comprises:
a third servo-motor positioned on the gear mounting member;
a second drive gear coupled to motor shaft of the third servo-motor; and
a second driven gear rotatably mounted on an edge side of the gear mounting member while interiorly disposing the first driven gear, and engaged with the second drive gear.

12. The widening apparatus of claim 11, wherein:
the second movable rail disk is coupled to the second driven gear through a second flange; and
the second cam follower rail has a spiral shape.

13. The widening apparatus of claim 7, wherein the tool driving unit further comprises a fixed rail disk fixed to the gear mounting member, wherein the first movable rail disk and the second movable rail disk are positioned below the fixed rail disk, and wherein a plurality of guide rails are radially formed on an upper surface of fixed rail disk.

14. The widening apparatus of claim 13, wherein:
a rail groove radially extending from an outer edge to an inner edge of the fixed rail disk is formed in each of the plurality of guide rails; and
a rail hole is formed between the plurality of guide rails to vertically penetrate the fixed rail disk.

15. The widening apparatus of claim 14, wherein each of the plurality of lower widening tools comprises:

a first tool body coupled to the rail groove to be radially slidable, and disposed between and radially interior to the plurality of guide rails;

a lower coil gripper coupled to the first tool body, and forming a first coil support hole that is vertically penetrated; and a first cam robe coupled to the first tool body, and configured to vertically pass through the rail hole to be inserted into the first cam follower rail.

16. The widening apparatus of claim 15, wherein:

the lower coil gripper comprises a coil supporting portion vertically elongated at a radially interior end of the lower coil gripper; and a coil support groove connected to the first coil support hole is formed in the coil supporting portion.

17. The widening apparatus of claim 15, wherein each of the plurality of upper widening tools comprises:

a second tool body coupled to the rail groove to be radially slidable, and disposed between the plurality of guide rails and radially exterior to the first tool body;

an upper coil gripper coupled to the second tool body above the lower coil gripper, and forming a second coil support hole connected to the first coil support hole; and a second cam robe coupled to the second tool body, and configured to vertically pass through the rail hole to be inserted into the second cam follower rail.

18. The widening apparatus of claim 17, wherein the upper coil gripper comprises a coil pressing part formed at a radially interior end of the upper coil gripper and configured to pressurize the stator coils inserted into the first coil support hole.

* * * * *